Sept. 22, 1953 N. WALKER 2,652,945

TANK CLOSURE

Filed Feb. 11, 1950

Inventor
Nelson Walker
By Willits, Helmig & Baillio
Attorneys

Patented Sept. 22, 1953

2,652,945

UNITED STATES PATENT OFFICE 2,652,945

TANK CLOSURE

Nelson Walker, Flint, Mich., assignor to General Motors Corporation, Detroit, Mich., a corporation of Delaware Application February 11, 1950, Serial No. 143,746

2 Claims. (Cl. 220—40)

1

The present invention relates to a closure for tanks. In particular this invention is adaptable to use as a fuel tank closure but is not limited thereto.

Various tank closures have been devised in the past to accomplish such needs as ventilating the fuel tank, providing leak proof caps, and rattle-free closures. The tank closure claimed herein accomplishes all of these features and has the added advantages of providing a clog-free ventilating means; of ease of production, assembly and application; of inexpensiveness of manufacture and compactness as a whole.

It is an object of this invention to provide a tank closure which will be at all times close fitting and rattle-free with regard to the tank neck to which it is applied.

It is an object of this invention to provide a tank closure with an air passage therein capable of providing tank ventilation while minimizing the leakage of liquid from the tank due to splashing or turbulence of said liquid.

It is further an object of this invention to provide a tank closure with an air vent therein which will not clog but will be continual and adequately free from obstruction; such air venting means being easily and inexpensively manufactured and assembled.

The invention will appear more clearly from the following detailed description when taken in connection with the accompanying drawing, showing by way of example, a preferred embodiment of the inventive idea.

Figure 3:
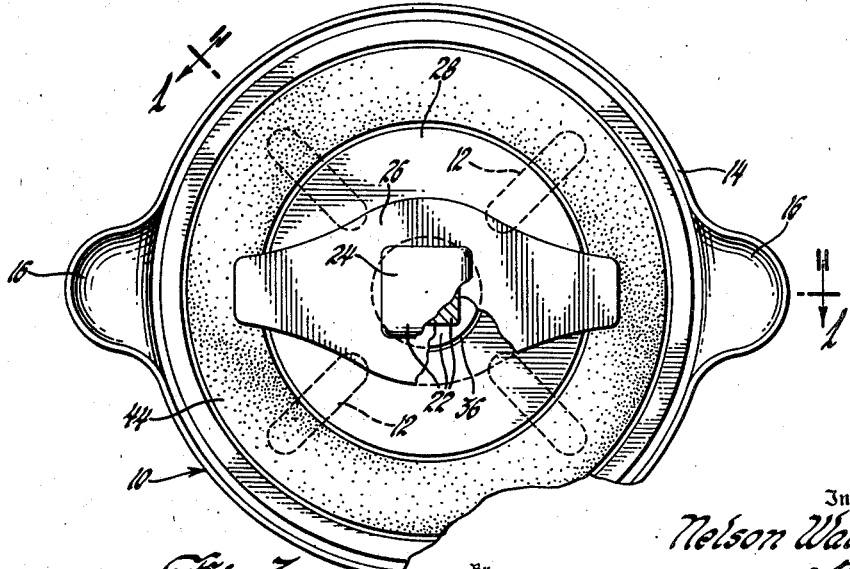
Figure 3 illustrates an under view of the tank closure, partially in section, as seen from the inside.

As illustrated in the drawing, the tank closure includes a stamped metal cap or cover plate 10 having a plurality of radially projecting ribs or embossments 12 pressed therein to provide ventilating passages in its under side, and a downwardly extending radial flange 14 at its outer edge. The stamped closure cap 10 has diametrically opposite projections or ears 16 as best seen in Figure 3, affording handles for convenient manipulation of this device. The cover plate 10, further, has a centrally located aperture 18 which may be square or otherwise shaped to receive a

2 similarly shaped reduced end of a centrally located cylindrical stud or rivet 22, secured to the cap by heading over the end portion as at 20. At the opposite end, the stud 22 carries a locking bar or plate 26 secured by the peened terminal 24 and properly keyed against rotation relative to the stud as by means of a square interfit of the parts.

Loosely disposed about the central stud 22, and in the space between the cover plate 10 and the locking plate 26 is an annular gasket retaining and sealing member 28 designed to extend beyond the outer periphery of the tank neck 32 to be covered. The central portion of the gasket retainer 28 is cupped as at 34 to loosely seat upon the locking plate 26, and has an aperture 36 of somewhat larger size than the stud 22, which allows the gasket retaining member 28 to loosely circumscribe the cylindrical stud 22 with clearance therearound. The rim portion 40 of the gasket retainer 28 is in a plane parallel to, but axially offset, that of the central base portion 34 being separated by a perpendicular step or wall 42 of a height slightly less than the distance between the cover plate 10 and the locking plate 26. The gasket material or ring 44 is disposed upon the under side of the outer portion 40 of the gasket retainer 28. An annular ridge 46 extends above the upper face of the outer portion 40 of the gasket retainer 28 for engagement with the lower surface of the cover plate 10 when the cover plate is sealed upon the tank's neck 32.

A cam-surfaced member or insert 48 is secured within the tank filler neck 32 with its uppermost edge 50 in substantially the same plane as the inturned tank filler neck edge 52.

Figure 1:
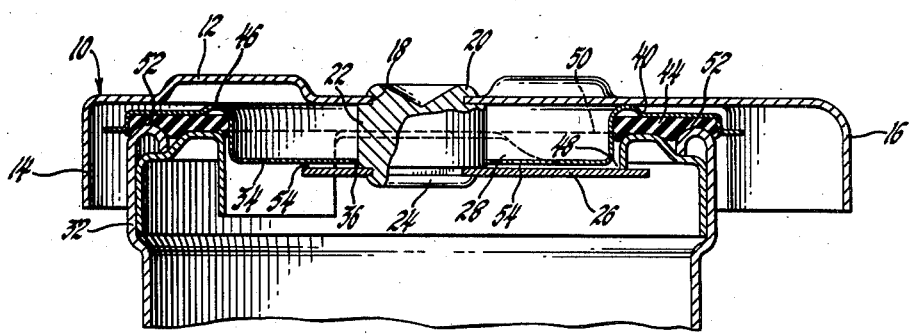
Figure 1 illustrates the invention in a form adapted for use with a tank filler neck and secured in position upon said tank filler neck. This sectional view is taken through 1—1 of Figure 3.
Figure 2:
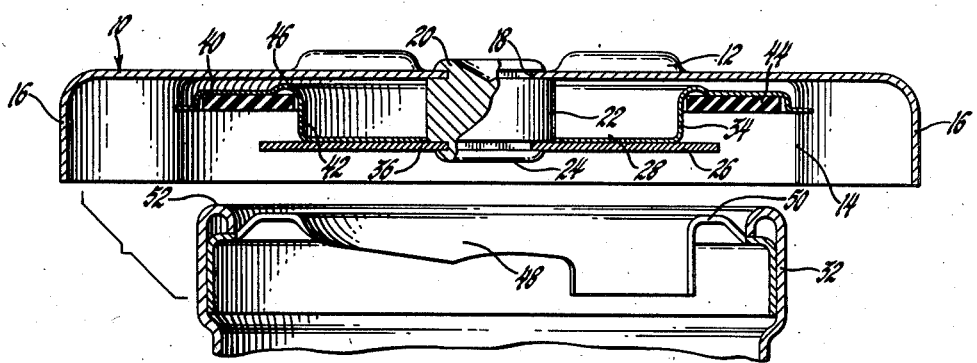
Figure 2 shows the tank closure prior to replacement upon the tank filler neck.

In operation the detachable closure unit is placed upon the tank neck 32, from a relative position as shown in Figure 2 of the drawing, and rotated by the ears 16 on the cover plate 10 to cause the locking plate or bar 26, by virtue of its fixed connection with the central stud 22, to likewise rotate. Such rotational movement of the locking bar 26 causes its engagement with the cam surfaces on the insert 48, which draws the cover plate 10 and associated members down upon the tank filler neck. This downward movement places the gasket material 44 against the upper rim 50 and 52 of the cam member and tank neck respectively, and causes the gasket retaining member 28 to be lifted from its normally loose position on the locking plate 26 to bear against the cover plate annularly along ridge 46 of its outer portion 40. The limitation of upward movement of the gasket retaining member 28 causes further cam action to force the upper rims 50 and 52 within the filler neck 32 into sealing contact with the gasket material 44.

It is to be noted that there is no relative motion between the gasket material 44 and the sealing surfaces 50 and 52, and hence no rubbing wear on these parts. When the gasket material 44 contacts the sealing surfaces 50 and 52 of the tank filler neck 32 it adheres thereto and is stationary while the cover plate 10 turns relatively over the bearing ridge 46 of the gasket retainer 28 until the locking plate 26 seats on the cam-surfaced member 48.

The air necessary to ventilate the tank enters the closure between the downwardly extending flange 14 and the outer side of the tank filler neck 32, and passes over the gasket retaining member 28 sealed upon the sealing rims 50 and 52 of the filler neck 32, through the hollow bosses 12 of the cover plate 10 which bridge the annular ridge 46 so as not to be obstructed thereby, then through aperture 36 in the gasket retaining member 28, and finally through passage 54 created by the up-lifted gasket retainer 28 into the tank filler neck. It is to be noted that the locking bar 26 baffles the breather opening 36, and that the central well afforded by the cup shape of the retainer 28 serves as a catch basin from which may drain back to the tank any liquid splashed past the baffle.

In order to provide a method of ventilating the tank which will be free of obstruction, it is evident that clearance spaces 36 and 54 between the gasket retainer 28, the central stud 22 and the locking plate 26 shall not be clogged. This invention provides that the gasket retaining member 28 is so positioned that removal and replacement of the tank closure, through normal usage, will result in such relative motion between the gasket retainer 28 and the central stud 22, as well as between the gasket retaining member and the locking plate 26, as will insure the fuel tank ventilation passages being self-cleaning and free of corrosion and other obstructions.

It is understood that the form of the apparatus and possible application of the invention herein illustrated and described in detail are not meant to limit the invention. This invention may be employed in other installations in an altered form or with variant details of arrangement without departing from the spirit of the invention or scope of the appending claims.

I claim:

1. A tank closure adapted to close the neck of a tank to be filled with fluid, said neck having an annular end surface and a cam member mounted adjacent said surface, said closure comprising a cover, a stud member rigidly secured to and depending centrally from said cover, a locking bar rigidly secured to said stud in spaced parallel relation with the inner surface of said cover, said bar being adapted to coact with said cam member to removably secure said closure to said neck, a centrally apertured sealing member loosely mounted on said stud intermediate the cover and the locking bar, said sealing member having a gasketed peripheral rim adapted to engage the annular end surface of said tank neck, the inner surface of said cover engaging the upper surface of said rim to force said gasketed rim into engagement with said end surface when said closure is mounted upon said neck, an axially disposed annular passage defined by the centrally apertured portion of said sealing member and the radially adjacent portion of said stud, said locking bar being adapted to partially overlie the lower surface of said sealing member so as to shield said axial passage from the fluid within said tank, a second annular passage normal to said axial passage and defined by the lower surface of said sealing member and the adjacent upper surface of said locking bar, said second passage communicating at its outer radial end with said neck and communicating at its inner radial end with said axial passage, said cover and said sealing member being formed to provide radial passage means in communication with said axial passage and extending beyond the rim of said sealing means whereby air may flow through said closure while the latter remains substantially liquid tight.

2. A tank closure adapted to close the neck of a tank to be filled with fluid, said neck having an annular end surface and a cam member mounted adjacent said surface, said closure comprising a cover, a stud member rigidly secured to and depending centrally from said cover, a locking bar rigidly secured to said stud in spaced parallel relation with the inner surface of said cover, said bar being adapted to coact with said cam member to removably secure said closure to said neck, a centrally apertured sealing member loosely mounted on said stud intermediate the cover and the locking bar, said sealing member having a gasketed peripheral rim adapted to engage the annular end surface of said tank neck, an annular ridge formed on the upper surface of said rim, the inner surface of said cover engaging said rim along said ridge to force said gasketed rim into engagement with said end surface when said closure is mounted upon said neck, an axially disposed annular passage defined by the centrally apertured portion of said sealing member and the radially adjacent portion of said stud, said sealing member being depressed radially inwardly of said rim to form a liquid catch basin which communicates with said axial passage, said locking bar being adapted to partially overlie the lower surface of said sealing member so as to shield said axial passage from the fluid within said tank, a second annular passage normal to said axial passage and defined by the lower surface of said sealing member and the adjacent upper surface of said locking bar, said second passage communicating at its outer radial end with said neck and communicating at its inner radial end with said axial passage, said cover and said sealing member being formed to provide radial passage means in communication with said axial passage and extending beyond the rim of said sealing means whereby air may flow through said closure while the latter remains substantially liquid tight, said sealing member being axially movable relative to said stud when removing and replacing said closure with respect to said neck to maintain said passages free of obstructions.

NELSON WALKER.

References Cited in the file of this patent

UNITED STATES PATENTS

| Number | Name | Date |
|---|---|---|
| 1,805,562 | Begue et al. | May 19, 1931 |
| 1,923,336 | Stant | Aug. 22, 1933 |
| 1,946,768 | Snell | Feb. 13, 1934 |
| 1,964,277 | Stant | June 26, 1934 |
| 1,990,621 | Stant | Feb. 12, 1935 |
| 2,316,507 | Dykeman | Apr. 13, 1943 |
| 2,346,723 | Brawn | Apr. 18, 1944 |
| 2,501,621 | Smith | Mar. 21, 1950 |